3,176,018
NOVEL DERIVATIVES OF RING E KETO YOHIMBE ALKALOIDS AND METHOD OF PREPARING SAME
Jay Donald Albright and Leon Goldman, Nanuet, N.Y., assignors to American Cyanamid Company, Stamford, Conn., a corporation of Maine
No Drawing. Filed May 24, 1963, Ser. No. 282,859
4 Claims. (Cl. 260—287)

This invention relates to new organic compounds and, more particularly, is concerned with novel derivatives of ring E keto yohimbe alkaloids which may be represented by the following general formula:

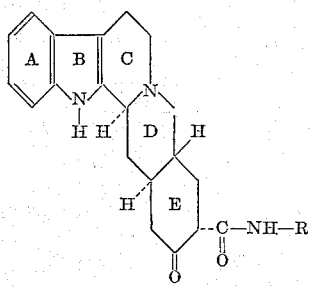

wherein R is phenyl, or substituted phenyl. Suitable substituted phenyl groups contemplated by the present invention are, for example, o-, m-, or p-(lower alkyl)phenyl, o-, m-, or p-(halo)phenyl, o-, m-, or p-(lower alkoxy)phenyl and 3,4,5-tri(lower alkoxy)phenyl. Suitable lower alkyl and lower alkoxy groups contemplated by the present invention are those having from 1 to 6 carbon atoms with methyl, ethyl, methoxy and ethoxy being preferred. Halogen is exemplified by chlorine and bromine.

The novel compounds of the present invention are, in general, white to tan crystalline solids, the free bases of which are soluble in organic solvents such as alcohols, chloroform, dimethylformamide, dioxane, pyridine and the like; and the salts of which are soluble in polar solvents such as water and lower alkanols.

The novel compounds of the present invention are valuable central nervous system depressants of low toxicity and may be administered orally or parenterally. When so administered they have been found to exhibit tranquillizing action similar to reserpine in amounts ranging from about 25 to about 350 milligrams per kilogram of body weight.

The present invention also embraces the useful non-toxic pharmaceutically acceptable acid-addition salts of these novel compounds. Typical acid-addition salts are the hydrochlorides, hydrobromides, sulfates, citrates, tartrates, succinates, and the like. Although the novel compounds of the present invention may be used as such, they are more preferably administered in the form of their non-toxic acid-addition salts which may be readily prepared by treatment with one equivalent of an acid such as hydrochloric, sulfuric, phosphoric, citric, etc. in a suitable solvent.

The novel compounds of the present invention may be prepared from yohimban-17-one which has been described by Witkop, Ann. 554, 83 (1943). The first step in the synthesis of the novel compounds of the present invention consists of the preparation of a yohimban-17-enamine by treatment of yohimban-17-one with a secondary aliphatic amine such as dimethylamine, diethylamine, pyrolidine, piperidine, morpholine, N-methylpiperazine, and the like. This reaction is ordinarily carried out by refluxing (with or without an acid catalyst such as p-toluenesulfonic acid, sulfuric acid, or the like) a mixture of the amine and yohimban-17-one in benzene, toluene, xylene, or some other inert, water immiscible solvent, with azeotropic removal of water, for a period of time ranging from 3 to 24 hours, more or less. Good results are achieved, for example, when the refluxing distillate is passed through a water absorbent such as alumina, anhydrous magnesium sulfate, or the like in a Soxhlet extractor, thereby continuously removing the water azeotropically distilled. The solvent and excess amine are then removed by concentration under vacuum, and the enamine is taken up from the dry residue in chloroform or another suitable inert solvent such as benzene, dioxane, tetrahydrofuran, dichloromethane or the like. The resulting enamine in solution may then be reacted with an appropriate isocyanate to prepare the novel compounds of the present invention according to the following reaction scheme:

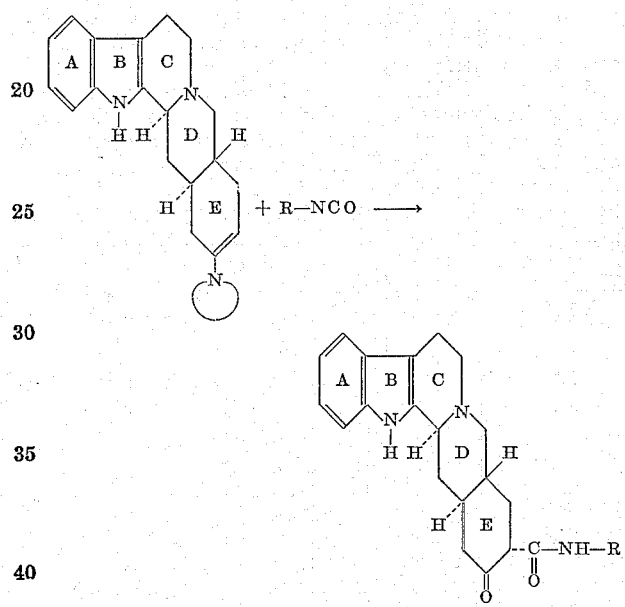

wherein

is the secondary aliphatic amino residue and R is as hereinabove defined. This reaction is ordinarily carried out under anhydrous conditions in an inert solvent such as chloroform, dioxane, carbon tetrachloriue, dichloromethane, and the like; at temperatures of from about 0° C. to about 100° C.; and over a period of time of from 5 to 24 hours, more or less. After the reaction is complete, the reaction mixture is poured into aqueous mineral acid (e.g., hydrochloric acid, sulfuric acid, etc.), and the resulting mixture stirred at room temperature for 1–5 hours or so. Finally, the mixture is brought to ca. pH 7.5 with aqueous base and the product is extracted with chloroform, benzene, toluene, or the like, and recovered by concentrating the pooled extracts. Purification is effected by conventional means. Isocyanates contemplated for the preparation of the novel compounds of this invention are, for example, phenyl isocyanate, o-tolyl isocyanate, p-bromophenyl isocyanate, 3,4,5-trimethoxyphenyl isocyanate, etc.

The invention will be described in greater detail in conjunction with the following specific examples.

EXAMPLE 1

*Preparation of pyrrolidine enamine of yohimban-17-one*

A mixture of 2.94 g. (0.010 mole) of yohimban-17-one- 5.0 g. of dry redistilled pyrrolidine, and 50 ml. of sodium dried benzene was refluxed for 18 hours in a Soxhlet extractor, the thimble of which contained anhydrous alumina to remove the water azeotropically distilled. The resulting solution was concentrated under reduced pressure. The residue was dissolved in 25 ml. of dry chloroform and the solvent again removed under reduced pressure. The reddish glass was heated at 90–100° C. under high vacuum for 2 hours to remove the last traces of pyrrolidine to yield the pyrrolidine enamine of yohimban-17-one.

EXAMPLE 2

*Preparation of 17-oxoyohimban-18-carbox-p-toluidide*

A solution of the pyrrolidine enamine of yohimban-17-one (0.025 mole) in 72 ml. of dry dichloromethane was treated with 3.00 g. (0.0225 mole) of p-toyl isocyanate. The solution was allowed to stand at room temperature under nitrogen for 19 hours, and the solvent was then removed under reduced pressure and the residue dissolved in 100 ml. of chloroform. The solution was poured onto a mixture of 75 g. of ice and 10 ml. of glacial acetic acid. The mixture was stirred at room temperature for 3 hours, and brought to pH 7.5 with concentrated ammonium hydroxide. An emulsion developed and 100 ml. of chloroform and 25 ml. of ethanol were added. The chloroform layer was separated and the aqueous layer extracted with three 100-ml. portions of chloroform. The chloroform extracts were combined and the solvent removed under reduced pressure. Trituration of the residue with ethanol gave 7.40 g. of crystals, melting point 215–218° C., dec. Recrystallization from acetone and from ethanol-chloroform gave 17-oxoyohimban-18-carbox-p-toluidide as white crystals, melting point 236–238° C., dec.

EXAMPLE 3

*Preparation of 17-oxoyohimban-18-carboxanilide*

To a cooled solution of 0.010 mole of the pyrrolidine enamine of yohimban-17-one (prepared from 2.94 g. of yohimban-17-one) in 20 ml. of benzene and 5 ml. of chloroform was added 0.95 ml. of phenyl isocyanate. The mixture, under nitrogen, was allowed to stand at room temperature for 19.5 hours and the solvent was then removed under reduced pressure. The residue was stirred for 20 minutes with 50 ml. of chloroform, 25 ml. of water, and 4.0 ml. of glacial acetic acid, and then brought to pH 7.5 with concentrated ammonium hydroxide. The chloroform layer was separated and the aqueous layer extracted with six 25-ml. portions of chloroform. The combined extracts were dried over sodium sulfate and the solvent removed under reduced pressure. The residue (5.0 g.) was triturated with 50 ml. of ethyl acetate and filtered. The filtrate, on standing, gave 1.28 g. of crystals, melting point 208–210° C., dec. Recrystallization from aqueous ethanol with the aid of activated carbon and recrystallization from ethanol-chloroform gave 0.214 g. of 17-oxoyohimban-18-carboxanilide as pale orange crytals, melting point 218–219° C., dec.

What is claimed is:

1. A member selected from the group consisting of a compound of the formula:

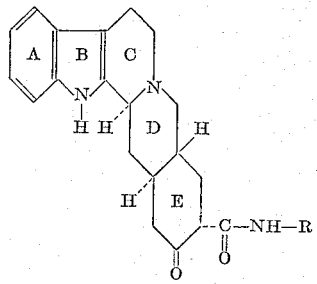

wherein R is selected from the group consisting of phenyl and mono(lower alkyl)phenyl; and a non-toxic pharmaceutically acceptable acid-addition salt thereof.

2. 17-oxoyohimban-18α-carboxanilide.

3. 17-oxoyohimban-18α-carbox-p-toluidide.

4. A process which comprises refluxing yohimban-17-one with a secondary aliphatic amine in an inert organic solvent; and contacting the yohimban-17-enamine so obtained with an isocyanate of the formula:

R—NCO wherein R is selected from the group consisting of phenyl and mono(lower alkyl)phenyl.

References Cited by the Examiner

Raphael et al.: (Ed.) Advances in Organic Chemistry, Interscience Pub., New York, vol. 5 (1963), pages 9–11.

WALTER A. MODANCE, *Primary Examiner.*

NICHOLAS S. RIZZO, *Examiner.*